UNITED STATES PATENT OFFICE.

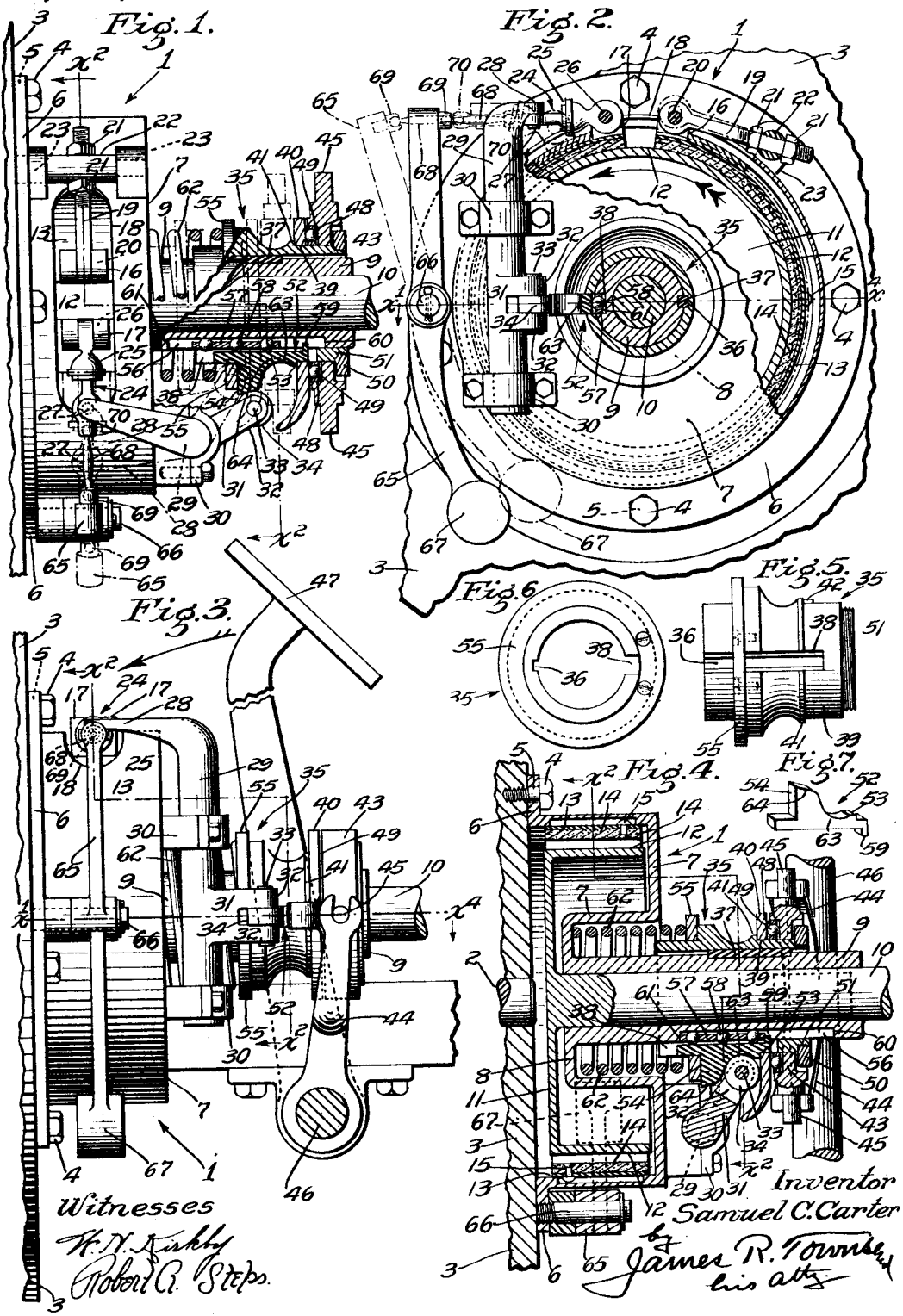

SAMUEL C. CARTER, OF LOS ANGELES, CALIFORNIA.

FRICTION-BAND CLUTCH.

1,128,947.   Specification of Letters Patent.   Patented Feb. 16, 1915.

Application filed October 21, 1912. Serial No. 727,074.

*To all whom it may concern:*

Be it known that I, SAMUEL C. CARTER, a citizen of the United States, residing at Los Angeles, in the county of Los Angeles and State of California, have invented new and useful Improvements in Friction-Band Clutches, of which the following is a specification.

One object of my invention is to provide a clutch which may easily be thrown into and out of engagement with the expenditure of little manual effort, special antifriction means being provided for relieving the sliding friction occasioned by the reaction of the clutching members while being thrown into and out of operation.

Another object of my invention is to provide the clutch with governing means whereby the clutching elements are caused to bind each other more securely as the speed of rotation of the shafts increases, thus counteracting the normal slipping tendency which increases also with the speed.

Novel features and elements shown and described, but not claimed in this application, are claimed in my co-pending application, entitled Friction band clutch, Serial No. 683,137.

The accompanying drawings illustrate the invention.

Figure 1 is a fragmental broken plan view partly in section on line $x^1$—$x^4$, of Figs. 2 and 3, showing the clutch in engagement, a fragment of the flywheel, to which the clutch is connected, being shown also. Dotted lines indicate the position of parts when the clutch is disengaged. Fig. 2 is a fragmental broken sectional view from irregular lines $x^2$, Figs. 1, 3 and 4, with parts in the position shown in Fig. 1. Dotted lines indicate the position of parts when the clutch is disengaged. Fig. 3 is a side elevation of the clutch embodying my invention. Fig. 4 is a mid-section on line $x^1$—$x^4$, Figs. 2 and 3, showing the clutch disengaged corresponding to the position indicated by dotted lines in Figs. 1 and 2. Fig. 5 is a detached side view of the sleeve in which the cam-piece is carried. Fig. 6 is an elevation from the left of Fig. 5. Fig. 7 is a perspective view of the cam-piece.

The external band carrying member 1 is a housing mounted on and rotating with the power shaft 2, and is fixed to the flywheel 3 of said shaft by cap screws 4 extending through holes 5 in the flange 6. Said member has a bent web 7 in which is formed a spring seat 8, and is provided with a sleeve or collar 9 that surrounds and may revolve on the adjacent end of the transmission shaft 10, the collar 9 being considered a continuation of shaft 2.

The internal clutch member comprises a flange 11 integral with the transmission shaft 10, or attached to the same in any suitable manner, and carrying the longitudinally extending drum or friction face 12. Normally the friction face is gripped by a friction band 13 carried by the external member 1, and having a lining or pad 14 of asbestos, fiber, or other suitable material attached to its inner gripping face by rivets 15. Lugs 16 and 17, secured to the extremities of band 13 extend through slot 18 in the external member, said lugs having connection from the outside with link means for contracting the band onto the friction face 12. It will be understood that band 13, is made of steel or other resilient material having a normal tendency to expand, and when unrestrained will expand off the friction face into the position shown in Fig. 4, thus disconnecting the external from the internal members, and accordingly disconnecting the power from the transmission shaft.

19 is a rigid adjustable anchor link pivoted at one end to lug 16 by pin 20, and is adjustably anchored and pivotally mounted at the other end to the external member 1 by nuts 21 bearing on the swivel-pin 22 journaled in bearings 23 on the external clutch member. The operating link 24, preferably provided between its ends with a universal joint 25, is pivoted at one end by pin 26 to the lug 17, and at the other end by pin 27 to an arm 28 on the band-operating rock-shaft 29, the said rock-shaft being journaled in capped bearings 30.

Mounted upon the rock-shaft 29 is the arm 31 provided with forks 32 between which is carried pin 33, revolubly supporting the roller follower 34.

Slidably mounted upon the collar 9 is the sleeve 35 provided with a key slot 36 in which runs key 37 rigidly attached to collar 9. This sleeve 35 is formed with a longitudinal slot 38 cut completely through one side of the sleeve in an axial plane and also with a drum 39 for a purpose described below. The collar 40, mounted on drum 39 of sleeve 35, is rigidly secured against shoulder 41 by suitable means, key lug 42 preventing the collar from rotating on the drum. Upon drum 39 is also mounted collar 43 which is attached to the forked arm 44 through pins 45, the said arm 44 being rigidly attached to shaft 46, which may be rotated by operating pedal 47. Between the collars 40 and 43, is provided the antifriction ring 48 containing ball bearings 49, said antifriction ring relieving the friction between rotating collar 40, and stationary collar 43. To retain the collar 43 on sleeve 35, nut 50 is screwed to the threaded extremity 51 of the sleeve, and prevents the collar from slipping off said extremity.

Fig. 7 shows in detail the cam piece 52 made of steel, and having shakers 53 and 54, shellac trough 63, and wedge face 64. The cam piece is adapted to lie in slot 38 of sleeve 35, having free axial motion with respect to the sleeve but being restrained from longitudinal motion along same by the shoulder 53 abutting collar 40, and by shoulder 54 abutting collar 55, the latter being rigidly attached to the sleeve in any suitable manner.

Into the collar 9 at a point below the cam piece 52 is cut the run-way 56 best seen in Fig. 4. In this run-way is the antifriction sheet 57, containing ball bearings 58 for purpose made clear below.

The longitudinal sliding motion of sleeve 35 on collar 9 is limited by shoulder 59 on cam piece 52 which shoulder abuts the face 60 at one extremity of way 56 limiting the travel of the sleeve in this direction, and abuts antifriction sheet 57, while in contact with the other face 61 of the way 56, thus limiting the travel of the sleeve in this direction.

Spring 62 is located between the seat 8 of web 7 and the collar 55 on sleeve 35, its tension constantly forcing the sleeve toward the right in Fig. 4. The antifriction sheet 57 assists the spring 62 in its operation, making a lighter spring possible and thereby reducing the manual effort necessary to operate said spring when the clutch members are separated.

When the shafts are not connected through the clutch the roller follower 34 rides in the shallow trough 63 on the cam piece 52. To disconnect the clutch, the sleeve 35 has been forced to its extreme left position in Fig. 4, by turning pedal 47 in the direction indicated by the arrow in Fig. 3. This rotation of the pedal is transmitted through shaft 46, forked arm 44, collar 43, and antifriction plate 48 to the collar 40, sleeve 35, and cam piece 52, it being understood that this motion of the sleeve is resisted by the spring 62.

With the clutch disconnected and the power shaft 2 and flywheel 3 rotating, the external member 1 and sleeve 9 rotate about the shaft 10 which remains motionless. Along with the collar 9, rotates sleeve 35, collar 40, and cam piece 52, the roller follower 34 retaining its position on the cam piece as in Fig. 4, since the same, being indirectly mounted on the external member 1, rotates synchronously with the sleeve 35, and therefore retains the same relative position with respect to the same.

As will be readily understood the collar 43 does not rotate and hence the desirability of providing antifriction means 48 between it and the rotating collar 40, for reducing the friction especially during the period when the clutching force is being transmitted between the said collars.

When it is desired to connect the transmission shaft 10 to power shaft 2, the pedal 47 is released and the spring 62, acting through collar 55, will throw sleeve 35 to the right on collar 9. The roller follower 34 will be forced up onto the wedge face 64 of cam piece 52, turning arm 31 so as to revolve the rock shaft 29, arm 28, and connecting link 24 in a manner that will be apparent from the drawings. This motion is transmitted to lug 17 and will carry the extremity of the friction band toward lug 16, thus binding the asbestos or fiber lining 14 to the internal friction face 12. This friction face being directly connected to the transmission shaft 10 completes a clutching connection from the power shaft to the transmission shaft and will cause the latter to rotate with the former.

In binding the friction band 13 tight to the face 12 considerable force must be transmitted through the roller follower 34, which in turn reacts against cam piece 52 forcibly. In order that this reaction may not be transmitted to the sleeve 35, the sliding friction of which, on the collar 9, would be very considerably increased, the cam piece 52 is made as a separate member, and beneath it is located the antifriction means 57. With this construction obviously none of the reaction is transferred to sleeve 35 but is transmitted *in totum* through the cam piece 52 to the antifriction expedient which carries the reaction during the sliding motion and reduces the sliding friction to a minimum. From this it will be clear that the physical force necessary to operate pedal 47 will also be reduced to a minimum, my construction thus providing a clutch which responds readily and avoids the annoyance of occasional bucking common to clutches where the clutching reaction is carried by the sliding sleeve itself.

As the speed of the power shaft is increased the slipping tendency between the friction pad 14 and face 12 is also increased owing partly to increased centrifugal force tending to throw the band off face 12, and partly to the increased power which is being transmitted from the pad to the friction face. In order to counteract this increased slipping tendency I provide the lever 65 fulcrumed to the flange 6 by pin 66. The lever 65 is provided at one extremity with the weight 67 and at the other extremity is connected through link 68 to the pin 27 and thence to the actuating extremity of the friction band by linkage 28, 24, 26, previously described. Link 68 is preferably provided with the universal joints 69 and 70.

In operation the centrifugal force acting to throw weight 67 from the shaft center, acts through lever 65, and links 68 and 24 to bind the extremity of the friction band tighter to the friction face 12. It will be readily understood that this compensating action increases as the speed of rotation of the shafts increases and will bind the friction band to the friction face more securely during the condition of higher speeds, thus avoiding the slip commonly experienced.

I claim:—

1. In a clutch, the combination of a rotatable member and a second rotatable member, a friction band operatively connected to the first said member and adapted to frictionally engage the said second member, means including a cam follower for causing said friction band to engage the second said member, a sleeve slidable along the first said member, said sleeve having a slot, a cam-piece for operating said follower, said cam piece being detachably carried by said sleeve so that it may be removed in a radial direction through the slot of said sleeve.

2. In a friction clutch, a rotatable member and a second rotatable member, a friction band operatively connected to the first said member, said friction band being adapted to frictionally engage the second said member, means including a cam follower for causing said friction band to engage the second said member, a sleeve slidable along the first said member, and said sleeve having a slot, a cam piece for operating said cam follower, said cam piece being detachably carried by said sleeve so that it may be removed in a radial direction through the slot of said sleeve, a race-way cut in the first said member immediately below said cam piece, anti-friction means restrained within said race-way and adapted to sustain the radial thrust of said cam piece as it operates said cam follower; and means for sliding said sleeve and cam piece along the first said member.

3. In a friction clutch, the combination of a rotatable member, a second rotatable member, a friction band operatively connected to the first said member, said friction band being adapted to frictionally engage the second said member, means including a cam follower for causing said friction band to engage said second member, a sleeve adapted to slide along the first said member, said sleeve having a slot for operating said cam follower, said cam piece being detachably carried by said sleeve, so that it may be removed in a radial direction through the slot of said sleeve, a race-way in the first said member immediately adjacent said cam piece, said race-way having terminal shoulders, an inwardly extending shoulder on said cam piece adapted to abut one of said terminal shoulders for limiting the sliding motion of said cam piece in one direction, a bar slidable in said race-way between the other terminal shoulder and the shoulder on the cam piece, said bar and the two last said shoulders being adapted to abut one another so as to limit the sliding motion of said cam piece in the other direction, said bar carrying anti-friction balls adapted to support the radial thrust of said cam piece as it operates said cam follower; and means for sliding said sleeve and cam piece along the first said member.

In testimony whereof, I have hereunto set my hand at Los Angeles, California, this 8th day of October, 1912.

SAMUEL C. CARTER.

In presence of—
JAMES R. TOWNSEND,
L. BELLE RICE.